US008991595B2

(12) United States Patent
Buter

(10) Patent No.: US 8,991,595 B2
(45) Date of Patent: Mar. 31, 2015

(54) MODULAR BELT MODULE
(75) Inventor: Germ Buter, KG Alkmaar (NL)
(73) Assignee: Ammeraal Beltech Modular A/S, Vejle (DK)
( * ) Notice: Subject to any disclaimer, the term of this patent is extended or adjusted under 35 U.S.C. 154(b) by 0 days.
(21) Appl. No.: 14/130,714
(22) PCT Filed: Jul. 4, 2012
(86) PCT No.: PCT/DK2012/050251
§ 371 (c)(1),
(2), (4) Date: Jan. 3, 2014
(87) PCT Pub. No.: WO2013/004246
PCT Pub. Date: Jan. 10, 2013
(65) Prior Publication Data
US 2014/0158503 A1 Jun. 12, 2014
(30) Foreign Application Priority Data
Jul. 5, 2011 (DK) .................................. 2011 70362
(51) Int. Cl.
*B65G 15/32* (2006.01)
*B65G 17/18* (2006.01)
(Continued)
(52) U.S. Cl.
CPC ............... *B65G 15/30* (2013.01); *B65G 15/32* (2013.01); *B65G 17/08* (2013.01); *B65G 17/40* (2013.01)
USPC ......................................................... 198/853
(58) Field of Classification Search
CPC ........ B65G 15/30; B65G 15/32; B65G 17/08; B65G 17/40
USPC .................................................. 198/851–853
See application file for complete search history.

(56) References Cited
U.S. PATENT DOCUMENTS
5,323,893 A * 6/1994 Garbagnati ................ 198/690.2
5,377,819 A * 1/1995 Horton et al. ................. 198/853
(Continued)

FOREIGN PATENT DOCUMENTS
AU 2002301405 B2 10/2002
EP 1 407 985 A1 4/2004

OTHER PUBLICATIONS
International Search Report prepared by the European Patent Office on Sep. 17, 2012, for International Application No. PCT/DK2012/050251.
(Continued)

*Primary Examiner* — Mark A Deuble
(74) *Attorney, Agent, or Firm* — Sheridan Ross P.C.

(57) ABSTRACT

Modular belt link module consisting of a main body element and an insert, where the modular belt link module is of the type which when assembled with a plurality of substantially identical modular belt link modules constitutes a conveyor belt, where each main body element has a central part, from which central part eye parts project in a forward and rearward direction with respect to the intended travelling direction, such that eye parts along a front part of one modular belt link may be interleafed between eye parts on a rear part of an adjacent modular belt link module, and where the eye parts each are provided with an aperture arranged laterally to the intended travelling direction, such that when the eye parts are interleafed, the apertures of adjacent eye parts overlap, and a connection pin may be inserted laterally at least through some of the apertures, hingely connecting adjacent modular belt link modules, wherein the central part and a plurality of the eye parts are provided with a continuous cavity, which cavity extends from either an upper or lower surface and towards the opposite surface, the surfaces defined relative to how the modular belt link module is arranged in the use situation, and where the cavity is at least partly enclosed by the modular belt link module material, and where an insert substantially corresponding in shape to the cavity and at least filling up the cavity is provided.

9 Claims, 3 Drawing Sheets

(51) Int. Cl.
  *B65G 17/40* (2006.01)
  *B65G 15/30* (2006.01)
  *B65G 17/08* (2006.01)

(56) References Cited

U.S. PATENT DOCUMENTS

| | | | |
|---|---|---|---|
| 5,439,097 A * | 8/1995 | Takahashi et al. | 198/867.01 |
| 5,497,874 A | 3/1996 | Layne | |
| 7,252,191 B2 * | 8/2007 | Ozaki et al. | 198/779 |
| 7,360,343 B1 | 4/2008 | Spransy et al. | |
| 7,364,038 B2 * | 4/2008 | Damkjaer | 198/853 |
| 7,559,422 B2 * | 7/2009 | Layne et al. | 198/850 |
| 8,430,236 B2 * | 4/2013 | Krischer | 198/853 |
| 2001/0052451 A1 * | 12/2001 | Ruoss et al. | 198/853 |
| 2003/0085106 A1 | 5/2003 | Corley et al. | |
| 2005/0241923 A1 * | 11/2005 | Garbagnati et al. | 198/853 |
| 2010/0038216 A1 * | 2/2010 | Andersen | 198/853 |

OTHER PUBLICATIONS

International Preliminary Report on Patentability for International (PCT) Patent Application No. PCT/DK2012/050251 dated Jan. 7, 2014, 6 pages.

* cited by examiner

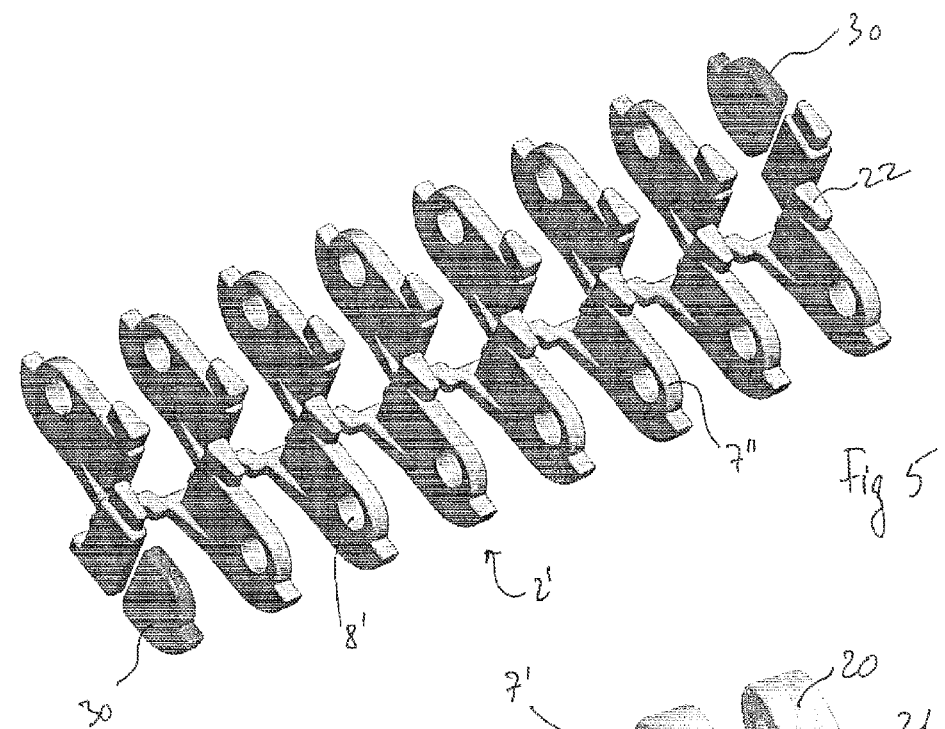
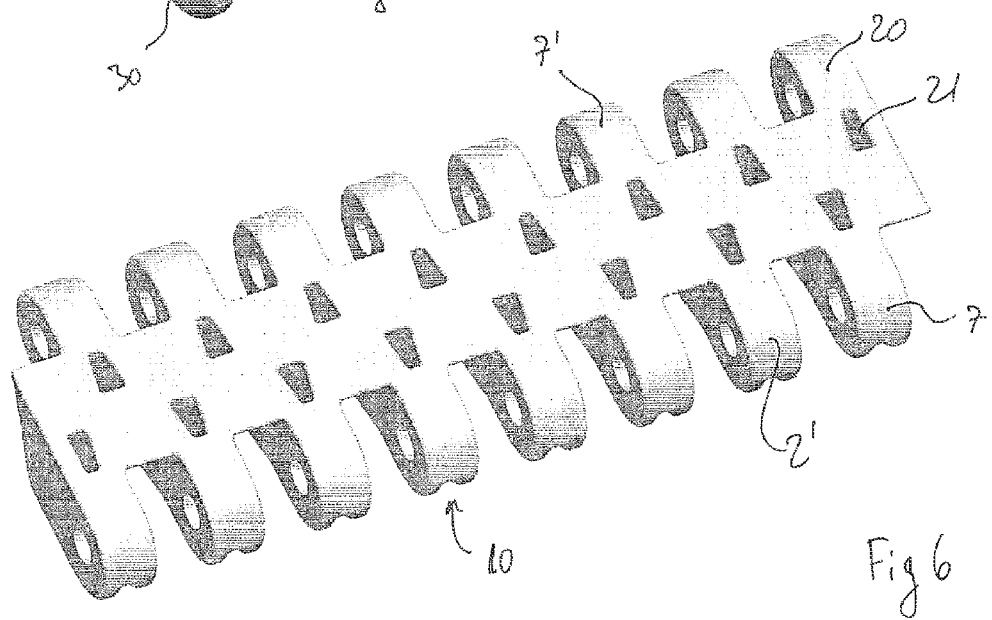

MODULAR BELT MODULE

CROSS REFERENCE TO RELATED APPLICATIONS

This application is a national stage application under 35 U.S.C. 371 and claims the benefit of PCT Application No. PCT/DK2012/050251 having an international filing date of Jul. 4, 2012, which designated the U.S., which PCT application claimed the benefit of Danish Application No. PA201170362 filed Jul. 5, 2011, the disclosure of each of which are incorporated herein by reference.

FIELD OF THE INVENTION

The present invention relates to a novel modular belt link module including an insert.

BACKGROUND OF THE INVENTION

In the art of conveyors made from assembling a large number of substantially identical injection moulded modular belt links a wide variety of different belt links exists which are developed in order to address special needs in the industry to which they are implemented. For some conveyors it is essential that they are very strong, other conveyors carry relatively heavy loads and as such have a high wear against the substructure, whereas other conveyors again need to provide secure footing for the products carried on the conveyors etc.

In order to address all these different needs the industry has over the years presented a number of various solutions including a special belt link module designed for specific tasks.

One such example is known from EP 1 407 985 wherein a modular belt link having eye parts arranged along forward and rearward edges for hingely connecting adjacent belt links, is disclosed. The module body between the forward and rearward edges is provided with a cavity in which cavity a high friction material is disposed, and protruding above the surface of the belt module body. In this manner a module having a standard configuration is provided, but due to the special insert, a special characteristic is provided. Furthermore the construction uses well known materials for manufacture of the main part of the belt link (which is also typically cheaper), thereby using proven injection moulding techniques, and afterwards adding the high friction material, which may not be suitable for injection moulding and/or provide the desired strength, wear, tension or other characteristics.

It is generally recognized that having to maintain a large stock of a wide variety of products is not very economically attractive, and in addition provides logistic problems (i.e. getting the right type of belt links to the right customer etc.).

OBJECT OF THE INVENTION

Consequently, it is an object of the present invention to provide a simplified modular belt link which may be modified such that the same belt link addresses a multitude of different requirement which was earlier solved by entirely different types of belt links.

DESCRIPTION OF THE INVENTION

In order to address this need the invention provides a modular belt link module consisting of a main body element and an insert, where the modular belt link module is of the type which when assembled with a plurality of substantially identical modular belt link modules constitutes a conveyor belt, where each modular belt link module has a central part, from which central part eye parts project in a forward and rearward direction with respect to the intended travelling direction, such that eye parts along a front part of one modular belt link may be interleafed between eye parts on a rear part of an adjacent modular belt link module, and where the eye parts each are provided with an aperture arranged laterally to the intended travelling direction, such that when the eye parts are interleafed, the apertures of adjacent eye parts overlap, and a connection pin may be inserted laterally at least through some of the apertures, hingely connecting adjacent modular belt link modules, wherein the main body element has a the central part and a plurality of the eye parts provided with a continuous cavity, which cavity extends from either an upper or lower surface and towards the opposite surface, the surfaces defined relative to how the modular belt link module is arranged in the use situation, and where the cavity is at least partly enclosed by the main body material, and where an insert substantially corresponding in shape to the cavity and at least filling up the cavity is provided.

In this connection the formulation that the insert substantially corresponds in shape to the cavity shall be understood such that the insert is manufactured in order to fill the cavity, but on the other hand with sufficient play in order to allow easy insertion without deforming the belt link module.

By having a main body element suitable to be fitted with an insert it is possible to provide a more or less standardized modular belt link module which will be assembled with identical modules in order to create a conveyor belt. The conveyor belt may be given various characteristics depending on the type of insert being inserted in the cavity in the main body element. These aspects will be discussed further below.

In a further advantageous embodiment the cavity extends to include the apertures provided in the eye parts, and where the insert is provided with apertures, such that as the insert is arranged in the cavity, the apertures in the insert will be superposed the apertures in the eye parts, allowing the connection pin to be inserted.

With this embodiment it is possible to transfer the forces which arise due to the traction in the belt to the inserts as such, such that the modular belt link module may due to a stronger insert be able to carry heavier loads or be exposed to larger tension forces using the same main body element as in other applications. This is due to the fact that the insert is in direct connection by means of the connection pin with the insert in an adjacent element such that forces are transferred directly from one insert through the connection pin to an adjacent insert and therefore the material and quality of the main body element is less important even for, for example high tension applications where the inserts will provide the necessary strength, or whatever characteristics is required.

In a further advantageous embodiment of the invention at least parts of the insert extend above the surface of the module from which the aperture is provided.

With this feature it is especially advantageous to provide inserts made from a low friction material, or extremely hard material. In the example suggested below, in a further advantageous embodiment reference is made to carbon reinforced or carbon based materials such that the wear and tear at the underside of a modular belt link module may be reduced, due to the extreme wear capabilities of these materials. The material from which the main body element is made has no influence on the wear and tear characteristics of the modular belt link as such, in that as the insert projects beyond the main body element it is the insert's characteristics which will be determining the characteristics of the modular belt link module. When the insert is made from materials having low fric-friction, such as for example nylon based polymers or polymers containing Teflon® or Delarin® the insert provides for very low frictional resistance against the substructure, such that a larger part of the power needed to propel the conveyor, is used for transporting goods instead of moving the conveyor.

In a further advantageous embodiment the cavity in a number of point or areas of the insert extend above the surface of the module from which the aperture is provided.

With this embodiment it is possible to provide special features on the surface of the modular belt link module, for example increased friction which may be desirable if personnel is to travel on the belt, or if especially wet or heavy products are to be transported on an inclined conveyor and in many other instances.

One of these instances is specifically referred to in a further advantageous embodiment where the insert is made from an electrically conductive material, or a material comprising electrically conductive means.

For a number of applications where personnel is working either on or very close to a conveyor belt it is desirable to be able to continuously discharge the conveyor belt such that no static electricity arises which can be both harmful to products transported on the conveyor belt and may cause shock and discomfort to personnel working on or adjacent the conveyor belt.

By providing the insert with electrically conductive means and in the substructure providing an electrical grounding circuit facility it is possible to continuously discharge the conveyor belt and in this manner minimise or altogether alleviate the problem with static electricity.

In a still further advantageous embodiment the insert is made from a carbon reinforced or carbon based material or a low friction polymer material, and where the insert projects below the lower surface of the modular belt link module.

The wear and strength capabilities of carbon reinforced or carbon based materials is widely known and by providing an insert made from these materials very strong structures are possible or/and structures with increased wear capabilities such that the overall modular belt link module may be provided with special characteristics.

As the main body element is usually made from a relatively cheap plastic compound, and the design of the insert makes it possible to optimize and minimize the use of the more expensive materials such as for example carbon reinforced and carbon based material and overall cheaper modular belt link module may be achieved, but with the same or increased characteristics deriving from the insert material as a consequence.

Naturally, the provision of low friction polymer material as insert provides for less friction against the carrying surface and consequently for less force needed to rotate the endless belt conveyor such that either a smaller motor may be used with less power consumption, or larger effective loads may be carried on the conveyor belt as compared to normal conveyor belts having a higher friction with the substructure.

The invention in a further advantageous embodiment provides a modular belt link module where the insert is made from a material of lesser quality than the material from which the modular module is made. Lesser quality shall in this context be understood as a polymer material which is usually cheaper, has less strength characteristics, etc., such that the insert according to this embodiment functions as a cheap filler for the core part of the modular belt link module. The insert does not necessarily in this embodiment have any function besides mass and filler in the cavity.

In a still further advantageous embodiment the continuous cavity is relatively shallow superposed the main part of the module and relatively deep superposed the eye parts. With this configuration it is possible to improve further the use of the special characteristics of the insert and at the same time limit the amount of material from which the insert is made as the insert is usually made from materials of higher cost due to their special characteristics and therefore a limitation on the volume/weight of that material will provide additional savings.

DESCRIPTION OF THE DRAWING

The invention will now be explained with reference to the accompanying drawings wherein FIG. 5 illustrates an insert according to a second embodiment of the invention FIG. 6 illustrates the main body element according to a second embodiment of the invention

DETAILED DESCRIPTION OF THE INVENTION

Like parts of the various parts of the module are provided with the same reference numbers in all embodiments.

Figure 1:
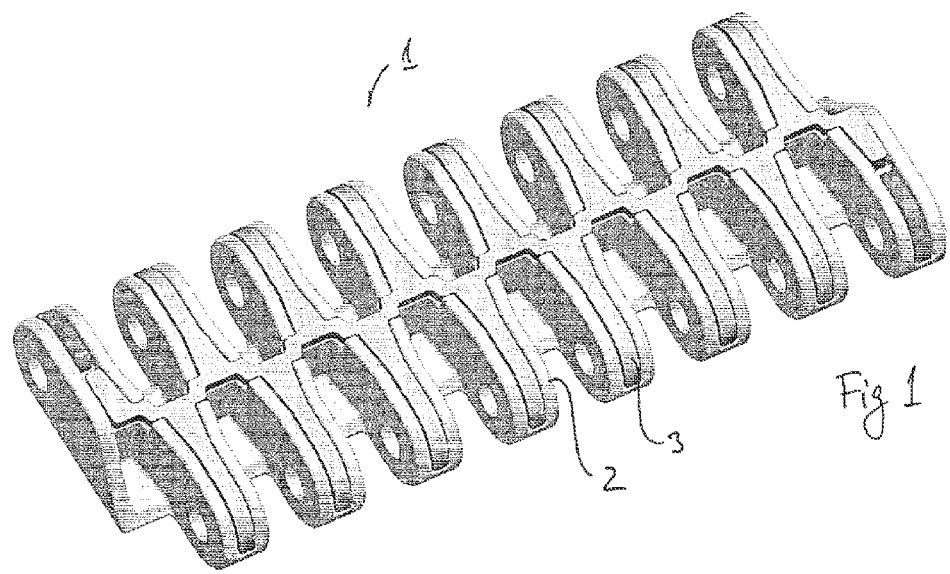
FIG. 1 illustrates a modular belt link module according to a first embodiment of the invention

In FIG. 1 is illustrated a modular belt link module according to an embodiment of the invention.

Figure 2:
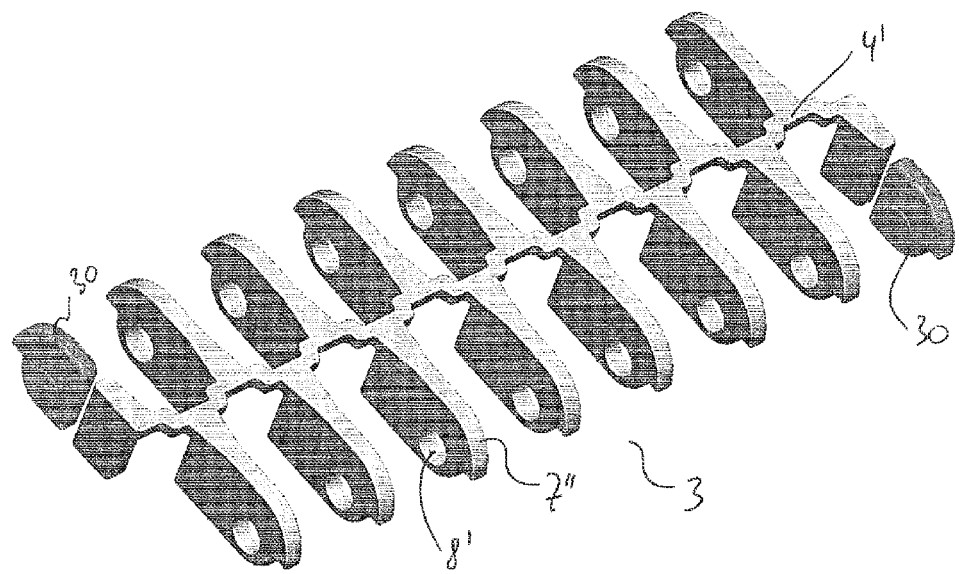
FIG. 2 illustrates an insert according to a first embodiment of the invention
Figure 3:
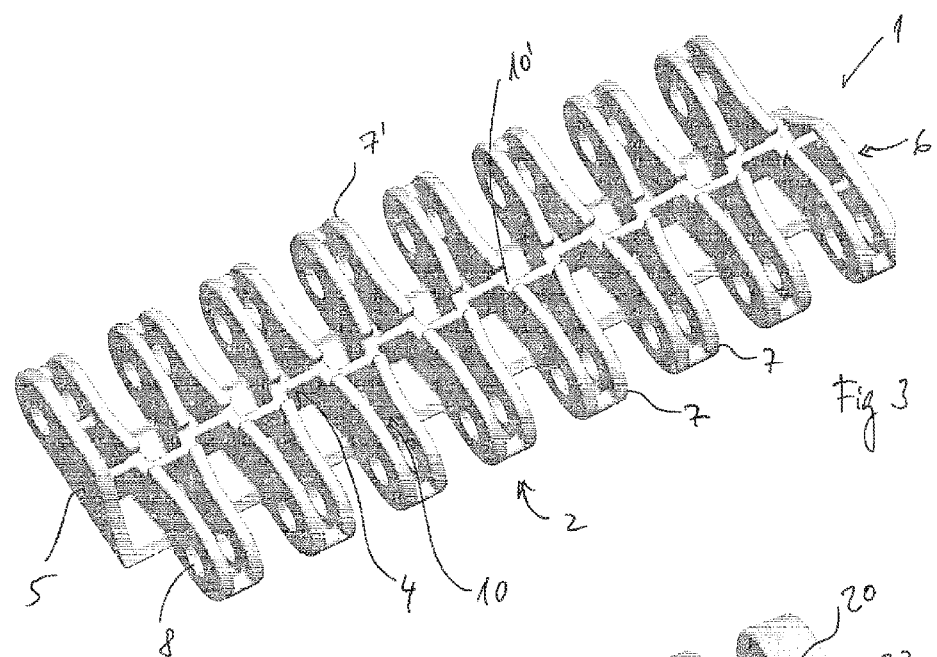
FIG. 3 illustrates the main body element according to a first embodiment of the invention

The modular belt link module consists of a main body element 2 as illustrated in FIG. 3 and an insert 3 illustrated in FIG. 2.

Turning back to FIG. 3 the underside of a main body element 2 comprising the main part of a modular belt link module 1 is illustrated. The main body element 2 is provided with a central part 4 which central part is provided across the main body element 2 such that the central part 4 is present between a first side edge 5 and a second side edge 6. Extending from the central part 4, a plurality of eye parts 7 are arranged such that eye parts 7 on one side of the central part are offset relative to eye parts 7' on the opposite side. In this manner when two identical modular belt link modules are assembled by bled by interleaving the eye parts 7 between eye parts 7' on an adjacent belt module, a connection rod (not illustrated) may be inserted through the apertures 8 provided perpendicular to the intended travelling direction in all the eye parts 7, 7'. In this manner adjacent modular belt links may be hingely connected.

In the underside as illustrated in FIG. 3 a continuous cavity 10 is provided where in this embodiment all the eye parts are provided with cavities 10 where the cavities are at least partly enclosed by the main body element's material.

Therefore, by manufacturing an insert 3 as illustrated with reference to FIG. 2 having dimensions substantially corresponding to the cavity 10 it is possible to insert the insert 3 into the cavity 10 of the main body element 2 whereby the combined construction as illustrated in FIG. 1 is achieved.

In this embodiment the insert 3 as depicted in FIG. 2 is also provided with apertures 8' in the insert sections 7" designed to be inserted in the cavities of the eye parts 7, 7' such that the apertures 8 and 8" will be superposed. It will be possible to insert the connection rod (not illustrated) in order to connect adjacent modular belt link modules into an endless conveyor structure.

As is evident, especially from FIG. 3, the continuous cavity 10 has a shallower extent 10' along the central part 4 of the main body element than the extent of the cavity in the eye parts 10. As a consequence the insert suitable to be inserted into the cavities 10, 10' illustrated with reference to FIG. 3 shall also have a configuration as illustrated in FIG. 2 where the part of the insert 4' designed to be introduced into the cavity superposed the central part 4 shall have a thinner cross section as compared to the insert's extent suitable to be inserted into the eye parts 7, 7'. In this manner the insert as depicted in FIG. 2 will fit snugly into the cavities 10, 10' as illustrated with reference to FIG. 3 and thereby in a simple form have a configuration as illustrated with reference to FIG. 1. In this embodiment the insert 3 depicted in FIG. 2 is made from a carbon based polymer such that it will be a very hard material and thereby present very good wear capabilities to the modular belt link module as illustrated with reference to FIG. 1.

Figure 4:
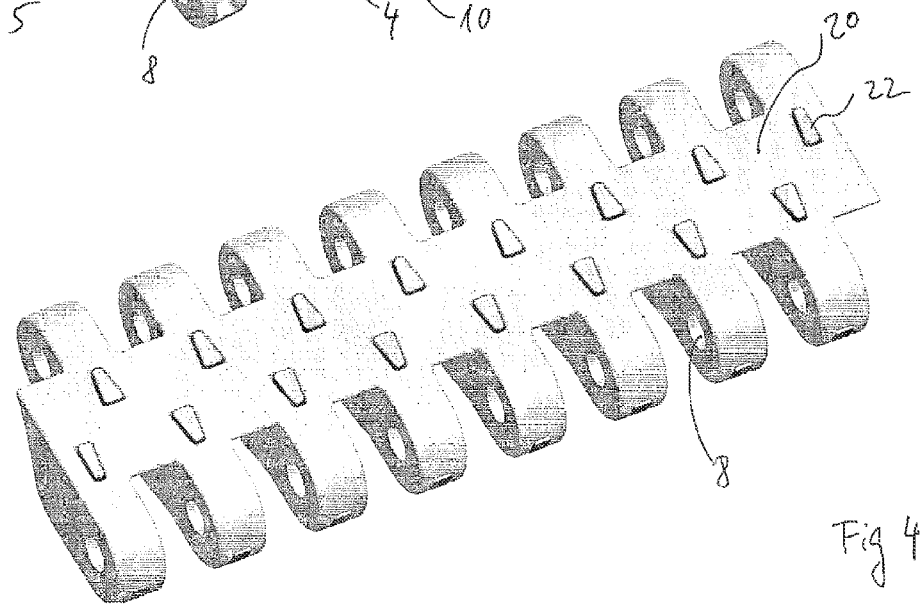
FIG. 4 illustrates a modular belt link module according to a second embodiment of the invention

Turning to the FIGS. 4-6 another embodiment of the invention is illustrated. In this embodiment the upper side 20 of the main body element 2', see FIG. 6, is provided with a number of apertures 21. The underside of the main body element 20 will be substantially corresponding to the underside depicted in FIG. 3, however, with the addition of the apertures 21.

The insert suitable to be inserted into the cavities of the main body element 2' is depicted in FIG. 5. The insert 2' has the geometrical configuration corresponding to the insert depicted and described with reference to FIG. 2 with the addition of a number of protrusions 22. The protrusions 22 are geometrically dimensioned such that when the insert 2' is inserted in the cavities 10 in the main body element 20, the protrusions 22 will substantially fill the apertures 21 and extend above the upper surface 20 of the main body element 2'. This is illustrated with reference to FIG. 4.

The protrusions 22 may advantageously have special characteristics such as for example very high friction or the like.

In addition to the two embodiments discussed above a combined embodiment where the lower part of the insert is a hard material or low friction material such as for example carbon reinforced polymer or a low friction material such as Delarin® (a nylon material) or Teflon® may be combined. The two embodiments may be combined such that the lower part of the module 1 exhibits improved wear characteristics and low friction characteristics whereas the upper part due to the protrusions 22 extending through apertures 21 exhibits high friction. The insert may either be manufactured by an injection moulding process where the high friction/high strength material is co-injection moulded with the high wear material (2K process) or it may be two separate pieces which are assembled in the cavities 10.

For other combinations of characteristics, the insert may also be a two part insert.

In the figures a locking part 30 is indicated. This locking part 30 serves to hinder the connection pin (not illustrated) in being dislodged. Other connection pin systems not requiring a locking part may be used with the invention without departing from the scope of the invention as set out in the appended claims. The locking part 30 is not part of the protection.

During manufacture the insert and the main body element are typically manufactured at separate injection moulding machines and by means of a robot assembled into modular belt link modules as illustrated with reference to FIGS. 1 and 4. Naturally, the inventive modular belt link modules may also be assembled by hand.

A further advantage arising from the possibility of assembling/disassembling the modular belt link modules is the fact that if a belt needs to be renovated, it is only necessary to replace the worn part, for example the wear part inserted in the underside of the modular belt link as explained with reference to FIGS. 1-3, or the high friction part illustrated in FIG. 5 without having to discard the main body element. Therefore, substantial savings may be achieved both with respect to materials, but especially with respect to cost, in that only the pertinent part must be replaced without having to discard the entire conveyor belt structure.

The invention claimed is:

1. A modular belt link module comprising:
   a main body element and an insert, where the modular belt link module when assembled with a plurality of substantially identical modular belt link modules constitutes a conveyor belt
   each modular belt link module having a central part and eye parts that project in a forward and rearward direction with respect to an intended travelling direction, such that eye parts along a front part of one modular belt link may be interleafed between corresponding eye parts on a rear part of an adjacent modular belt link module
   the eye parts each having an aperture arranged laterally to the intended travelling direction, such that when the eye parts are interleafed, the apertures of adjacent eye parts overlap, and a connection pin may be inserted laterally at least through some of the apertures, hingely connecting adjacent modular belt link modules
   wherein the eye parts form a continuous cavity that extends from either an upper or lower surface and towards the opposite surface, the surfaces defined relative to how the modular belt link module is arranged in use, and where the continuous cavity is at least partly enclosed by the main body element; and
   an insert substantially corresponding in shape to the cavity and at least filling up the cavity with play is provided, wherein the cavity extends to include the apertures provided in the eye parts, and where the insert is provided with apertures, such that as the insert is arranged with play in the cavity, the apertures in the insert will be superposed with the apertures in the eye parts, allowing the connection pin to be inserted.

2. The modular belt link module according to claim 1 wherein at least parts of the insert extend above the surface of the module from which the aperture is provided.

3. The modular belt link module according to claim 1 wherein the cavity in a number of points or areas penetrates the opposite surface, and where the insert is provided with projections dimensioned to penetrate and extend through said areas.

4. The modular belt link module according to claim 3 wherein the insert is made from an electrically conductive material, or a material comprising electrically conductive means.

5. The modular belt link module according to claim 1 wherein the insert is made from a carbon reinforced or carbon based material or a low friction polymer material, and where the insert projects below the lower surface of the modular belt link module.

6. The modular belt link module according to claim 3 wherein the insert is made from a high friction material.

7. The modular belt link module according to claim 1 wherein the insert is made from a material of different quality than the material from which the modular module is made.

8. The modular belt link module according to claim 1 wherein the continuous cavity is relatively shallow superposed the main part of the module and relatively deep superposed the eye parts.

9. The modular belt link module according to claim 6 wherein the high friciton material is rubber or modified rubber.

* * * * *